United States Patent
Peterson et al.

(10) Patent No.: US 11,418,647 B1
(45) Date of Patent: Aug. 16, 2022

(54) PRESENTING MULTIPLE CUSTOMER CONTACT CHANNELS IN A BROWSEABLE INTERFACE

(71) Applicant: Intrado Corporation, Omaha, NE (US)

(72) Inventors: Patrick Peterson, Cambridge, MA (US); Michael Thome, Melrose, MA (US)

(73) Assignee: Intrado Corporation, Omaha, NE (US)

(*) Notice: Subject to any disclaimer, the term of this patent is extended or adjusted under 35 U.S.C. 154(b) by 0 days.

(21) Appl. No.: 17/073,215

(22) Filed: Oct. 16, 2020

(51) Int. Cl.
*H04M 3/00* (2006.01)
*H04M 3/51* (2006.01)
*G06Q 30/00* (2012.01)
*G06Q 10/06* (2012.01)

(52) U.S. Cl.
CPC .... *H04M 3/5175* (2013.01); *G06Q 10/06395* (2013.01); *G06Q 30/016* (2013.01)

(58) Field of Classification Search
CPC .......... H04M 3/5175; G06Q 10/06395; G06Q 30/016
See application file for complete search history.

(56) References Cited

U.S. PATENT DOCUMENTS

2018/0315000 A1* 11/2018 Kulkarni ............... H04W 88/16
2019/0318409 A1* 10/2019 Vallelunga ......... G06Q 30/0631

* cited by examiner

*Primary Examiner* — Rasha S Al Aubaidi

(57) ABSTRACT

To enable analysis of the performance of a customer contact center handling interactions across multiple types of communication channels, a system is provided that collects and analyzes data across the multiple channels and allows a user, such as an analyst, to analyze customer journeys that comprise multiple interactions, or contacts, across multiple communication channel types. That analysis can be used to identify journeys with similar, perhaps problematic, characteristics and provide the analyst user with the ability to examine the collected data for each identified journey individually. Once a journey is selected, the system displays the collected data in a coordinated display of journey timeline, text history, and sequence of automatically detected significant events. This single-journey display, applied to multiple journeys in succession, allows the analyst to explicitly annotate problems or formulate hypotheses about problems that can then be quantified for impact by refining the initial multi-journey analysis.

17 Claims, 8 Drawing Sheets

PRESENTING MULTIPLE CUSTOMER CONTACT CHANNELS IN A BROWSEABLE INTERFACE

BACKGROUND

Customer service centers are used to handle various aspects of the customer/service provider relationship. These aspects may include new enquiries, sales, service queries, repairs, faults and complaints. Customer service centers can be a cost-efficient method for processing these forms of customer contact and are therefore desirable from an enterprise point of view.

Call centers of an enterprise may utilize both live call agents and Interactive Voice Response (IVR) systems to process a caller through a call enquiry. To improve the customer experience, customer service centers may collect data on both call agents and on the IVR systems. The data is used to generate reports that can assist to identify errors, inefficiencies or areas for improvement of the service center.

With modern communications, customers also have a range of other options for contacting an enterprise. For example, customers may seek answers initially through a general internet search and then by direct review of an enterprise web page. At the enterprise web site, the customer may be able to engage in a text chat with an automated chatbot and/or a live agent. Text chats can even take place via mobile phone messaging apps. Often, a direct call to a call center is a customer's last resort for an enquiry. Thus, monitoring of a call center may not be sufficiently representative of a customer's experience in dealing with an enterprise.

What is required is an improved system and method for monitoring and analyzing diverse, connected customer interactions with an enterprise.

SUMMARY

To enable analysis of the performance of a customer contact center handling interactions across multiple types of communication channels, a system is provided that collects and analyzes data across the multiple channels and allows a user, such as an analyst, to analyze customer journeys that comprise multiple interactions, or contacts, across multiple communication channel types. That analysis can be used to identify journeys with similar, perhaps problematic, characteristics and provide the analyst with the ability to examine the collected data for each identified journey individually. Once a journey is selected, the system displays the collected data in a coordinated display of journey timeline, text history, and sequence of automatically detected significant events. This single-journey display, applied to multiple journeys in succession, allows the analyst to explicitly annotate problems or formulate hypotheses about problems that can then be quantified for impact by refining the initial multi-journey analysis.

In one aspect of the disclosure, there is provided a method for analyzing the performance of a customer contact center handling customer interactions across a plurality of types of communication channels. The method may comprise processing data collected for a plurality of customer interactions across the plurality of types of communication channels of the customer contact center, generating a browsable interface that enables a user to specify one or more properties of one or more customer interactions, searching the collected data and displaying a list of one or more journeys, the one or more journeys each comprising one or more interactions with a single customer having the specified one or more properties, and enabling a user to select a journey from the list of journeys. In response to a selection of a journey from the list of journeys, the method may also comprise determining a plurality of journey interactions that occurred with a customer during the selected journey, the plurality of journey interactions comprising a plurality of communication channel types, and displaying a visual representation of the plurality of journey interactions which occurred during the selected journey.

In one aspect of the disclosure, there is provided a system for analyzing the performance of a customer contact center handling customer interactions across a plurality of types of communication channels, the system comprising at least one processor. The processor may be programmed to process data collected for a plurality of customer interactions across the plurality of types of communication channels of the customer contact center, generate a browsable interface that enables a user to specify one or more properties of one or more customer interactions, search the collected data and display a list of one or more journeys, the one or more journeys each comprising one or more interactions with a single customer having the specified one or more properties, and enable a user to select a journey from the list of journeys. In response to a selection of a journey from the list of journeys, the system may also determine a plurality of journey interactions that occurred with a customer during the selected journey, the plurality of journey interactions comprising a plurality of communication channel types, and display a visual representation of the plurality of journey interactions which occurred during the selected journey.

In one aspect of the disclosure, there is provided a non-transitory computer readable medium comprising instructions, that when read by a processor, cause the processor to perform processing data collected for a plurality of customer interactions across the plurality of types of communication channels of the customer contact center, generating a browsable interface that enables a user to specify one or more properties of one or more customer interactions, searching the collected data and displaying a list of one or more journeys, the one or more journeys each comprising one or more interactions with a single customer having the specified one or more properties, and enabling a user to select a journey from the list of journeys. In response to a selection of a journey from the list of journeys, the processor may also determine a plurality of journey interactions that occurred with a customer during the selected journey, the plurality of journey interactions comprising a plurality of communication channel types, and displaying a visual representation of the plurality of journey interactions which occurred during the selected journey.

BRIEF DESCRIPTION OF THE DRAWINGS

Reference will now be made, by way of example only, to specific embodiments and to the accompanying drawings in which.

DETAILED DESCRIPTION

Customer Contact Centers want to understand more about customer "journeys" that span multiple channels, such as a web session that leads to a chat session that leads to a phone call. In the present disclosure, there will be described a system and method for monitoring multiple channels and analyzing the multi-channel journey as a single entity.

Figure 1:
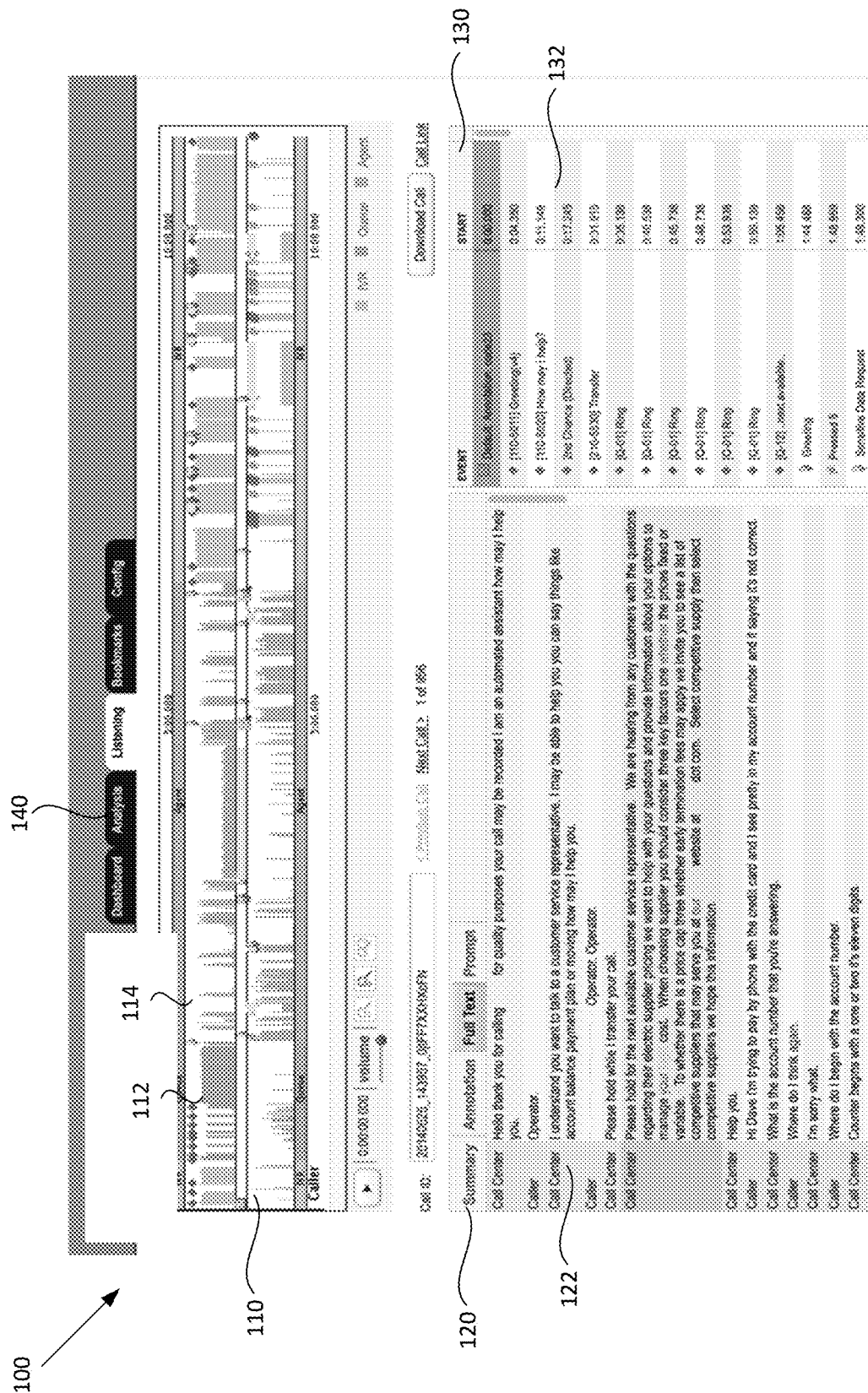
FIG. 1 shows an embodiment of a browsable interface for analyzing single calls.

In FIG. 1, there is shown a call browser 100. The call browser 100 is an interface that a person, such as a manager or analyst within a call center or enterprise, can use to analyze a call and events relating to a call. The call browser presents calls in three coordinated displays. A first window 110 displays a timeline 112 of the call audio waveform with annotations 114 of significant events in the call. A second window 120 displays a listing of the call's transcribed text 122. A third window 130 displays a time-ordered list of events 132 that have been detected automatically or annotated by human analysts. These displays 110, 120, 130 are coordinated in that selecting a point in any display will cause display cursors within each window to move to the corresponding point in the call. The Analysis tab 140 gives analysts access to an interface for selecting a list of calls for browsing based on selectable call properties that have been determined automatically by a call analysis process. An example of an analysis interface that can also be utilized in the embodiments to be described below, is depicted at 500 in FIG. 5. The Analysis interface allows calls to be filtered based on call properties, and especially based on event patterns detected within individual calls.

U.S. Pat. Nos. 8,102,973 and 9,407,764, the contents of each of which are incorporated herein by reference, describe a system and method by which call data for a call to a call center may be collected and analyzed to subsequently produce a call browser as shown in FIG. 1. For example, the system may record a call into a call center as an audio waveform that can be passed to a speech to text converter to produce a text transcription of conversation. Various events may be annotated in the call either by automatic processes or by human analysts. Events may include, without limitation, an IVR prompt, change of speaker, periods of silence or volume elevations, particular words, touch tone entries, dropped calls, etc. Events may be derived from the text of the speech, or from other event generators such as from the IVR system, live agent inputs, etc. Call properties and event patterns can then be used to select calls with similar properties for browsing and analysis at the level of individual calls.

Processing of calls as described above may be useful for analyzing the performance and efficiency of a call center. Analysis can identify issues that interfere with satisfying a customer's reason for calling. In addition, the ability to repeat the focus on single calls across a range of similar calls may allow patterns to be determined that can identify prevalent issues within the call center. Patterns may reveal, for example, issues with call agents, issues with an IVR menu, etc. However, analyzing calls alone does not always provide a complete picture of a customer's journey with a business or enterprise. A multi-channel system will therefore be described herein.

As an overview, the system collects data from multiple customer contact channels and identifies multi-channel journeys in the data, applies automated analytics, and generates a journey browser. The journey browser enables an analyst to use a Journey Analysis selection and charting capability to identify journeys with similar characteristics and possible problems. The analyst may select single journeys identified in the Journey Analysis to investigate with a Journey Scanner. The Journey Scanner may present a Journey Scanner timeline, text history, and automatically-detected event list over sequential journeys that enables the analyst to identify and possibly annotate problem areas. The analyst quantifies the impact of problem areas by refining Journey Analysis charts.

Figure 2:
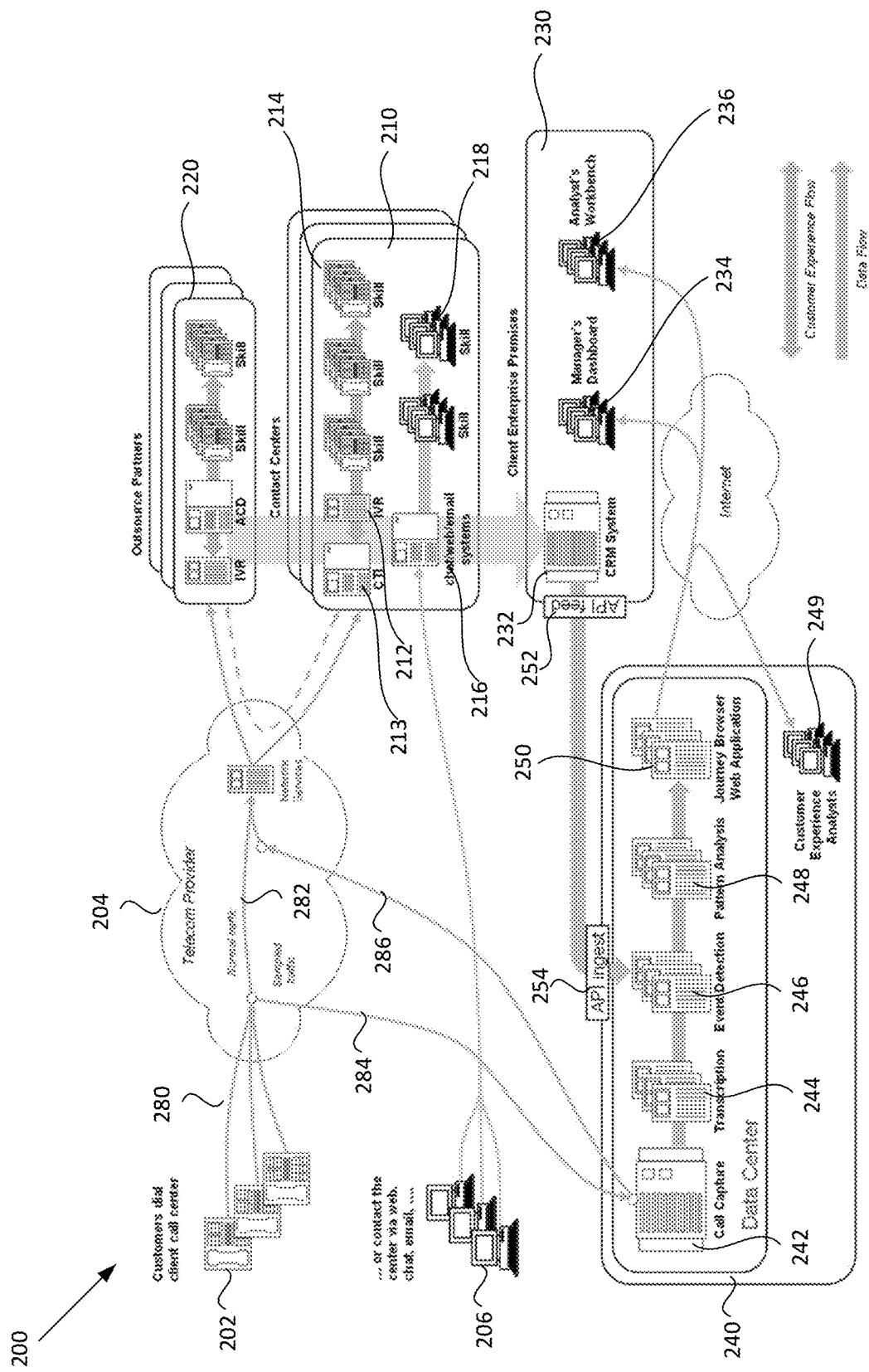
FIG. 2 shows an embodiment of a system architecture for analyzing interactions across multiple channels.

An architecture for implementing an embodiment of a multi-channel journey analyzer is depicted in FIG. 2. The architecture 200 provides a system for capturing and analyzing customer contact to an enterprise and extends the capabilities of the call browser of FIG. 1 to include channels in addition to calls into call centers. The system 200 includes one or more contact centers 210 that may provide a range of contact services through multiple contact channels including telephony channels and internet-based channels. In one embodiment, a contact center may provide call services through an IVR system 212 that may also utilize a Computer Telephone Integration (CTI) system 213 for routing calls as necessary to live agents 214 that can provide additional skills for handling calls. The call center 210 is configured to provide call service to customers 202 through a communications network 204. The communications network 204 may include conventional telephony that enables calls to be placed through mobile or landline telephone devices. Customers 206 may also contact the customer contact center 210 via the internet. The contact center 210 may include one or more servers 216 or similar systems for providing internet-based web, chat, and email services. Many of the internet-based services may be automated, but live agents 218 may also be deployed within the call center 210 to handle internet-based customer contact where required.

While the enterprise may operate the contact center 210, the enterprise may also outsource one or more functions of the contact center through one or more outsource partners 220.

CTI 213 provides sophisticated call routing and handling using modern digital telephony. A typical CTI system will be comprised of servers distributed among the contact centers of an enterprise and, perhaps, at the Enterprise level. The distributed nature of CTI enables it to collect Enterprise-wide data that may be critical to linking calls to other channels.

The system 200 may include enterprise premises 230 that can be localized or distributed. The enterprise premises 230 may include management and administration services including customer relationship management (CRM) systems 232, databases, etc. The CRM 232 is usually an Enterprise system where non-call customer interaction data is often stored. The CTI 213 and/or CRM 232 are the components of the system 200 that have most, if not all, of the data that is required for multi-channel analytics.

In the example architecture of FIG. 2, a journey analytics system 240 is depicted as a distinct operation. The journey analytics system 240 may be operated by the enterprise or may be operated by a third-party service.

The journey analytics system 240, also referred to herein as a journey analytics engine, includes call capture 242, transcription service 244, event detection 246, pattern analysis 248 and a journey browser web application 250.

The journey analytics system 240 is typically operated as a service to the client enterprise for analyzing customer interactions for the enterprise. Interaction data is analyzed and processed and made available to the enterprise, typically through a manager dashboard 234 or analyst workbench 236 of the enterprise 230. As will be described below, in one embodiment, the journey analytics system 240 provides a searchable browser interface that enables manager and analyst users to find journeys that share similar properties and then drill down to analyze interactions at the level of a single journey.

In one embodiment, the call capture system 242 is configured to sample calls to the contact center 210. For the initial setup, a new termination is added to the contact number for the customer contact center to route calls to the journey analytics system 240. The journey analytics system 240 may provide a dedicated number to receive inbound calls and a toll-free number is established for the contact center 210 to receive calls from the journey analytics system 240.

Call sampling then proceeds as follows. A customer 202 dials the contact number 280. The network 204 allocates a (typically small) percentage of calls to the journey analytics system 240. Calls that are not sampled are passed 282 to any applicable network services and on to the contact center 210 (or outsource partner 220).

For sampled calls 284, the call capture service 242 answers the inbound call, places a call to the return toll-free number 286, bridges the two calls, 284 and 286, together, and initiates recording. Digital signaling makes this quick and imperceptible to callers. Calls to the return toll-free number 286 are delivered to the exact same first step of call processing as normal calls that are not sampled. The call capture service 242 passes thru the original calling party number (ANI)—enabling all call handling to proceed as if the call had arrived via the normal path 282.

The call capture service passes the recorded conversation to the transcription service 244, which performs speech-to-text transcription of the conversation. The event detection service 246 processes the speech audio, transcription, and other call data such as key presses, transfers, IVR selections etc. to automatically determine a series of events that occurred during the call. Events are typically based on automated detection but may also be supplemented with annotations by analysts.

The internet-based services 216 of the contact center 210 will also record customer interaction data. Customer interaction data may include, without limitation, chat transcriptions, online form submissions, contact form submissions, page requests, document download requests etc. that may occur during internet-based communication sessions. This information may be provided to the CRM systems 232 and then to the journey analytics system 240 where it can be processed and then interpreted by live analysts 249.

The Client Enterprise Premises 230 will typically want to tightly control their data and will need to provide a facility for packaging that data and either sending it to the journey analytics system 240 or, possibly, allowing the journey analytics system 240 to pull it from a controlled access point. In one embodiment depicted in FIG. 2, an API connection having an API feed end 252 at the Client Enterprise Premises 230, and an ingest end 254 at the journey analytics system 240 allows the journey analytics engine 240 to receive data, especially non-phone-channel data, from the CRM system 232 or other contact center systems such as CTI 213. It is preferable, although not essential, that the data received by the journey analytics system 240 is as raw and as close to the detailed customer interaction experience as possible. This should not require anything more than pulling data from existing databases, typically in the CTI 213 or CRM 232 systems but maybe others.

Figure 3:
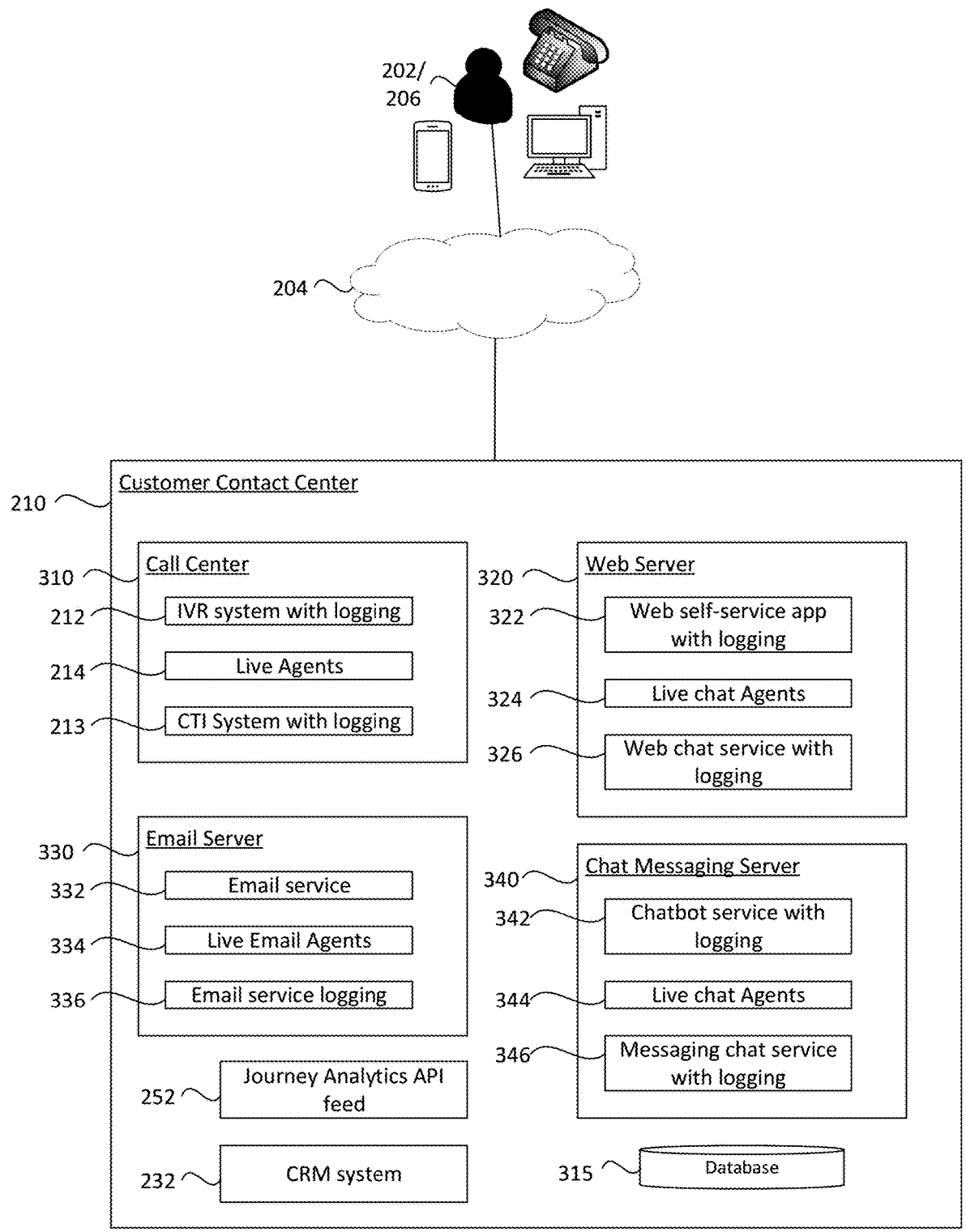
FIG. 3 schematically represents an embodiment of a customer contact center for multiple contact channels.

A more detailed, logical (but not necessarily physical) schematic of contact center 210 components is depicted in FIG. 3. The contact center 210 includes a call center 310 for receiving voice calls from customers 202 via the telephone network 204. The call center 310 may include an IVR 212 with logging capabilities, live agents 214 and a CTI system 213 with logging. The CTI system 213 is able to record aspects of calls beyond the audio and telephony data captured by the call capture service 242. This auxiliary information may include call routing information such as destination agent skill groups, wait times, handle times, agent IDs, or other information specific to the handling of a call. All logged data may be stored in the CTI system 213 system itself, in a CRM 232 system, or in a contact center database 315 that may be provided at the level of the enterprise 230. The recorded log data may be pushed to or retrieved by the journey analytics system 240 via the journey analytics feed API 252, which is depicted in FIG. 3 within the Customer Contact Center 210 but is typically provided at the Enterprise 230 level.

The contact center 210 of FIG. 3 may also include one or more servers 320 that are able to provide web-browser-based services, such as self-service apps 322 or web chat 326, through an internet enabled portion of the communications network 204 to customers 206 on internet enabled devices including mobile phones, tablets, portable computers, desktop computers, etc. These web services are typically backed up with live chat agents 324 that can intervene as necessary to ensure that customers are served successfully. The web services, such as 322 and 326, as well as any chat agent interactions, typically log important interaction information such as cookies, webpage forms, click events, a device address (e.g. MAC address), web session identifier, user ID, case ID, username, chat agent ID and skill group, if necessary, and other details. Session specific data may include a navigation path through the pages of the enterprise's website, documents downloaded, images, chat text, etc. Web session log data may be stored within a web server 322 or 326, within a CRM system 232, and/or in a system database 315. Regardless of where the log data is stored, it can be provided to the journey analytics system 240 via the journey analytics feed API 252.

In addition to serving webpages to customers, a chat messaging server 340 may also provide internet-based chat messaging services that are more direct and user-friendly than web pages. These messaging services may include automated "chatbots" 342 or chat services 346 with live agents 344 that provide text- and rich-content-based interactions with users on internet enabled smartphones, tablets, etc. These services may also log important aspects of the chat messaging service, including the text of the conversation, case ID, user ID, agent ID, additional events, internal details behind chatbot responses, timestamps, documents provided to the user, images, etc. These logs can be stored internally by the messaging server and/or in a global database 315, or CRM system 232 and can be provided to the journey analytics system 240 via the journey feed API 252.

The Customer Contact Center 210 may also include an email server 330. An email service 332 would support interactions between customers 206 and live email agents 334 through one or more email channels. Email service logging 336 may record email service data such as sender address, case ID, text of the emails, contact details from signature, documents, images, etc. Data may be extracted from the email header, body, or metadata of an email. Logs can be stored internally to the email service logging 336 and/or in a global dataset 315, or CRM system 232, and can be provided to the journey analytics system 240 via the journey analytics feed API 252.

While the call center 310, web server 320, email server 330 and messaging server 340 are depicted as discrete units to illustrate their discrete functions and particularly their discrete communication channel types, the person skilled in the art will readily understand that aspects of these units can be merged and can share componentry and functionality. In particular, the various logging systems 212, 213, 322, 326, 336, 342, 346 may be embodied in common components, hardware, networks, etc., either in a centralized or distributed manner. A CRM system 232 is a typical form of such a centralized system. In addition, the person skilled in the art will understand that the multi-channel customer contact center 210, as depicted in FIG. 3, can be extended to other communication channels by following a similar framework so that the system can capture customer contact across any type of synchronous or asynchronous communications between customers and service center agents.

The journey analytics ingest API 254 in FIG. 2 receives data collected by the feed API 252 from all available channels in the contact center 210, as stored by each channel's logging system, by the CRM system 232, or in a common database 315. The ingest data is then fed into the contact processing pipeline's event detection stage 246, event pattern analysis 248, and journey browser web application 250 that generates the interface that displays journey data for a user.

The journey analytics engine 240 may include one or more processors and one or more memories. The memory may include memory such as read-only memory that stores program instructions, software and data. The memory may also include random access memory for use in executing the functions of the journey analytics engine. The journey analytics engine may be programmed to process call data and internet data for a plurality of interactions between a plurality of users/customers and an enterprise.

The journey analytics engine 240 may be programmed to generate a journey browser that enables a user, such as a call center manager, administrator, analyst or the like, to review recorded data in a searchable format.

To generate the journey browser, data received from the call capture service 242 via the transcription service 244 and data received from the enterprise, such as chat channel transcripts, are processed in the event detection system 246 to automatically detect events that analysts have defined as interesting. Event detection is specific to media channels and feeds channel-specific classifier models in the pattern analysis system 248, which classifies contacts based on patterns of events in time. The term "contact" as used herein refers to an interaction or action of contacting the contact center, rather than the specific user, who might be listed in a contact list, that engages in the interaction. For example, an IVR self-serve classifier based on audio prompt events can label as: (not attempted, unsuccessful, balance info, payment, etc.) based on the detection and order of events in the IVR channel associated with self-service. Similarly, a chat contact self-serve classifier based on chat events, might label as (not attempted, unsuccessful, exit after balance info, etc.). Journey events and pattern classifiers are derived from component channel events and classifiers (e.g. voice self-serve success after unsuccessful chat). Channel events may be based on, amongst others, inputs from call or chat customers, live agent inputs, and output from an IVR or chatbot script. The events may be based on a transcript of the speech, chat, email, etc. and may be based on spoken or texted words or phrases. The events may be based on features of speech audio, including changes in pitch or volume. Events may also be based on information derived from sources other than the interaction stream itself, such as CTI or CRM events like transfers to specific agent queues or accesses to backend data, that are being undertaken on behalf of the customer. Other events will be apparent to the person skilled in the art. Events may be associated with a timestamp that identifies when during an interaction the event occurred. Events may also be associated with a caller ID, e.g. derived from a caller ANI (Automatic Number Identification), or other user identifier, e.g. email address, MAC address, etc. Events may also be associated with an agent ID, if appropriate.

The journey browser web application 250 of the journey analytics system 240 maintains a database of all events, pattern analysis classifiers and classifier results produced in the pattern analysis, in addition to the other available data such as timestamps, user ID, agent IDs, and relevant CTI or CRM data. The journey browser is programmed to generate metrics and produce data displays based selectable journey data that integrate multiple channel interactions for each unique customer, with links to each interaction. As explained above, event definitions and pattern classifier models are channel (call, chat, web, email, etc.) specific, which will require displays specific to each interaction channel in addition to the overall journey display. The charting and display frameworks, however, are nearly channel independent.

Figure 4:
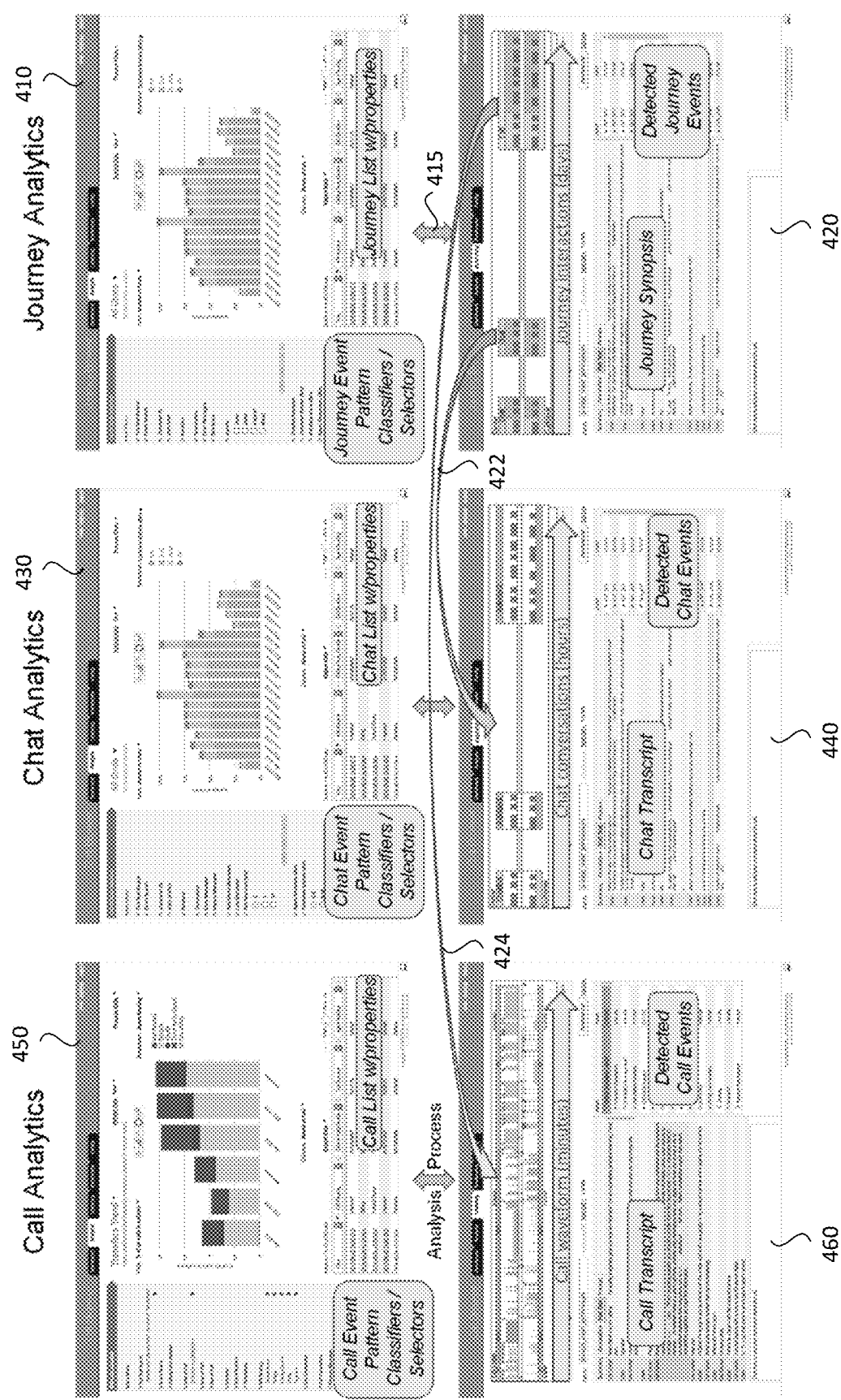
FIG. 4 provides an overview of displays for journey data and interaction data.

An overview of the data displays produced by the journey browser web application 250 is depicted in FIG. 4. The top-level data view that the journey browser provides is the journey analysis interface 410 through which a user, such as a manager or analyst, may filter down to a set of similar journeys based on journey-level properties. The journey analysis interface 410 presents a filtered list of journeys and an associated configurable graph of analytics data for the filtered list. Journeys may be individually selected from the journey list to move 415 to a journey scanner view 420. The journey scanner includes a graphical timeline of interactions as experienced by the customer. The interactions are displayed in proper time order and identified by channel. For example, the journey timeline may display a web-channel session followed by a chat session and ending with a call before the customer issue is resolved. In addition to the timeline, the journey scanner also provides a text synopsis of the journey and an ordered list of journey events. These three views of the journey timeline: graphical, text synopsis, and event list, have synchronized cursors and playback, such that analysts can choose any segment of the interaction, in any view, to initiate playback and the 3 cursors will move in synchrony. Analysts can also select individual interactions within the journey for deeper analysis, indicated by the arrows to the left, in this case 422 for a chat contact followed by 424 for a call contact.

To support deeper analysis, the journey browser web application may also produce a chat analysis interface 430 through which the user may filter chat interactions and generate plots using properties and filters appropriate to the chat channel. Individual chats may be selected from the chat analysis interface to be examined in the chat scanner view 440.

The journey browser web application may also produce a call analysis interface 450 through which the user may filter the data at a call level. Individual calls may be selected from the call analysis interface for examination in the call listening interface 460.

Analytic interfaces for other communications channels such as email or web interactions may also be provided.

FIG. 4 depicts how the calls and chats may be related within a journey and how the journey browser application can provide a powerful tool for viewing these interdependencies and detecting patterns within the data. In particular, FIG. 4 shows that interactions appearing on a specific journey timeline can be individually selected and viewed and then similar channel-specific interactions can be analyzed using the analysis and timeline views for that channel.

Figure 5:
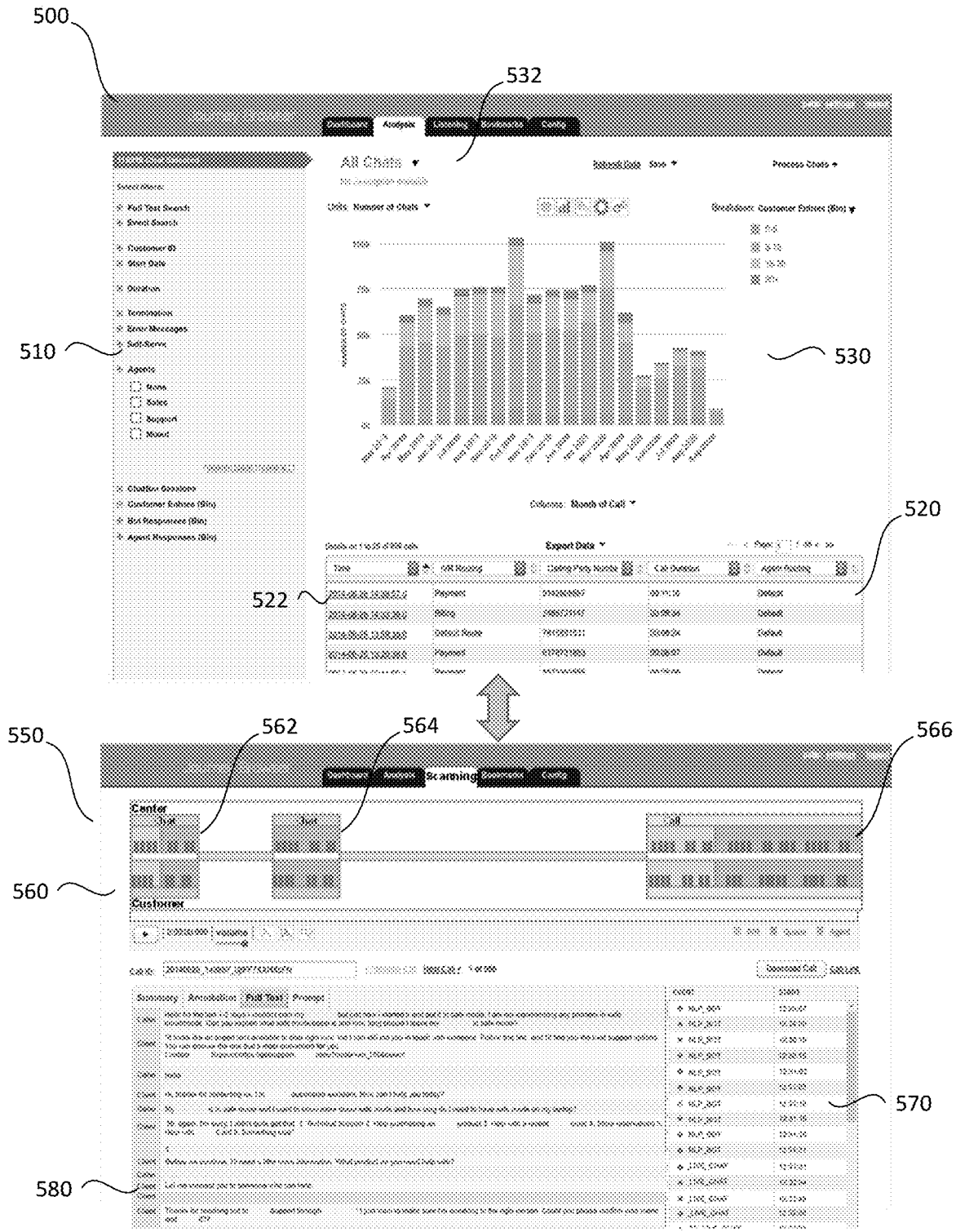
FIG. 5 shows an embodiment of a journey browser interface for searching interaction data and a visual display that displays events and dialogue for a single customer journey.

An embodiment of the journey analysis interface 410 is shown in more detail in FIG. 5. The interface 500 includes a list of filters 510 that enables the user to enter searchable parameters and select specific properties to focus on a set of journeys for analysis. The filter window 510 may include searchable parameters such as a text search phrase, a Case ID, a calling party number, email address, etc. that could be entered into text boxes. Other filter properties, such as journey start date, hour of the day, day of the week, duration ranges, CTI/CRM information (e.g., product, IVR applications, agent skill groups, customer satisfaction scores), etc., or categories produced by pattern classifiers (e.g., self-serve patterns, retries, opt-outs, interaction lengths in time or number of dialog steps), can be selected from a limited set of options. These options can be presented as checkboxes, drop-down menus, calendar date selectors, etc. Fields other than the examples above will be apparent to the person skilled in the art.

The interface 500 includes a list 520 of all journeys that match the filter criteria. Pattern and trend data 530 may also be displayed in chart form, such as authentication or self-serve percentages over time, or how call duration varies with call reasons. Different preconfigured pattern or trend analyses may be selected from a drop-down menu 532. The trend window 530 may also be configurable to change the way the data is displayed. This includes, for example, changes to the variables on horizontal and vertical axes, as well as breakdowns within bar charts, and even the type of chart, such as pie charts or timing charts.

The journey list 520 includes a list of individual journeys along with configurable columns showing properties for each journey. Each journey has a selection link 522 to drill down to the data specific to that journey in a single journey interface 550. The single journey interface 550 includes a timeline 560 of interactions. In the example depicted, the timeline 560 includes a first chat session 562, a second chat session 564 and a subsequent call 566, thus demonstrating that the journey is made up of multiple interactions across multiple channels. Each interaction on the timeline may be individually selectable to display data specific to that interaction.

The single journey interface 550 also includes a list of detected journey events 570. Events within the event list 570 may be individually selected to review a finer level of detail. The single journey interface 550 also includes a journey synopsis 580 which provides a scrollable list of the dialogue elements of the interactions that comprise the journey, for example text of chats, transcriptions of phone calls, etc. The three windows 560, 570, 580 of the single journey interface 550 are interlinked so that selecting one element of one window highlights the corresponding element or section within the other windows. For example, selecting an event in the events list 570 highlights the interaction on the timeline 560 and scrolls the dialogue window 580 to the point in the list at which the selected event occurred.

Figure 6:
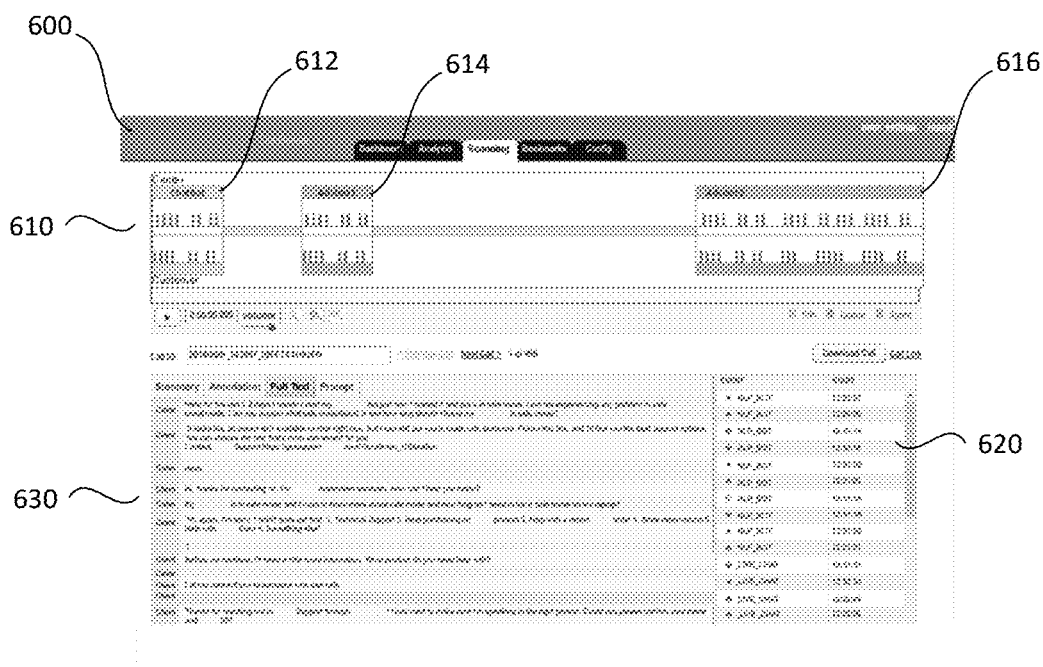
FIG. 6 shows a visual display that displays events and dialogue for a chat interaction.

A powerful aspect of the journey analysis is that a user may select a specific interaction from the single journey timeline 560 and review data relating to that specific interaction. For example, a user may select the chat interaction 564 and be presented with a display relating to that specific chat session. An embodiment of a single chat display 600 is depicted in FIG. 6. The chat display 600 has a similar form to the single journey display 550 and includes a timeline 610 of chat components that make up the chat session. In the example depicted, the timeline 610 includes a first chatbot session 612, a second live agent session 614 and a third advisor session 616. An event list 620 and a chat transcript 630 are provided in separate sub-windows.

As shown in FIG. 4 and in FIG. 1, a single call interface 460 may have a similar form to the single journey 550 and single chat interfaces 600. Although not depicted, additional interaction interfaces may be provided for other channels such as email.

Typically, a single call will last on the scale of minutes and a chat session may last on the scale of minutes to hours. A journey, however, may last on a timescale of days or longer. Therefore, tracking multiple customers' interactions over multiple journeys, across multiple channels, can reveal patterns and useful insights for an enterprise regarding how they handle customer contact for new sales enquiries, complaints, service requests, etc. Analyzing data at the journey level can provide an indication of where issues arise in the customer contact processes. Furthermore, where adjustments are made to the processes, the journey analytics can highlight the effects of the changes.

A key feature is the ability to access data relating to non-voice channels and to correlate that data with data relating to the voice channel. Customer ID, Case Number, Agent ID and other correlating parameters can all be used to find other stops on the customer journey. The system may search on any of these parameters, which can be used to trace back to earlier interactions with the same customer and select down to just a single interaction.

The journey analytics engine may be programmed to identify a common customer between interactions using various parameters. Various customer identifiers may be used to interrelate and crossmatch a set of the interaction data, including, without limitation, a caller ID (e.g. ANI or MSISDN), a customer number, email address, Machine Address Code (MAC), or other codes assigned by the enterprise. In one embodiment, a journey ID, such a case number or an anonymized customer ID, may be assigned to a user when a first contact is made between the user and the enterprise system. If a journey ID such as a case number is provided to the customer, it may be provided by a customer to a contact center via touch tone, speech, text, or other inputs. That journey ID may also be provided by the user in a web session, an email, a webchat session and/or a voice call. If a journey ID such as an anonymized customer ID is automatically tracked across interactions by the enterprise CRM system 232 and provided to the journey analytics engine 240, then that ID can be used to automatically identify the interactions along a journey.

The journey analytics engine may be programmed to correlate one or more user ID parameters to associate non-voice channel data with a call. For example, a customer email address may be stored in a customer database along with other ID parameters including a name, phone number, etc. Correlating different interactions across multiple channels of the customer contact center may be performed by cross referencing various customer ID parameters. For example, an email address of an email interaction may be correlated with an MSISDN of a call to assign each of these interactions to a common customer and thus a common journey. To assist in the correlation, customers may be prompted to enter unifying parameters, such as a case ID, product information, etc. at the customer interfaces provided by each channel, e.g. a web form, web chat, email, IVR prompt, etc.

It has thus been seen that selecting a single journey from a set of search results presented on a journey search interface 500 results in multiple interactions across multiple channels being displayed in the journey scanning interface 550.

Email and chat dialogues may utilize the same text analytics used for speech (after speech to text conversion) to determine events and waypoints, e.g. by identifying key words and phrases. Additional events may be created by analyst or other users by using an event annotation facility in a scanning view such as that for chat 600.

In one embodiment, the journey browser 500 may also display Customer Satisfaction sessions and survey data as a selectable interaction, with a full text of question and answers displayed in a dialogue window 580 and an event summary shown in the events list 570.

In one embodiment, there may be aspects of a customer's journey and interactions with a customer contact center that are not able to be directly recorded by the enterprise systems. For example, information may be passed from a supervisor to a call agent. There may also be physical mail, documents, screenshots, etc. that make up a valuable part of a customer's journey. Such information may be added to a journey timeline as third-party information and may be incorporated as a link (URL) to an information store.

More generally, the journey browser 500 may include a link, e.g. URL, to an enterprise system that enables a user, e.g. an enterprise analyst, to access enterprise systems to retrieve data related to customer journeys.

Figure 7:
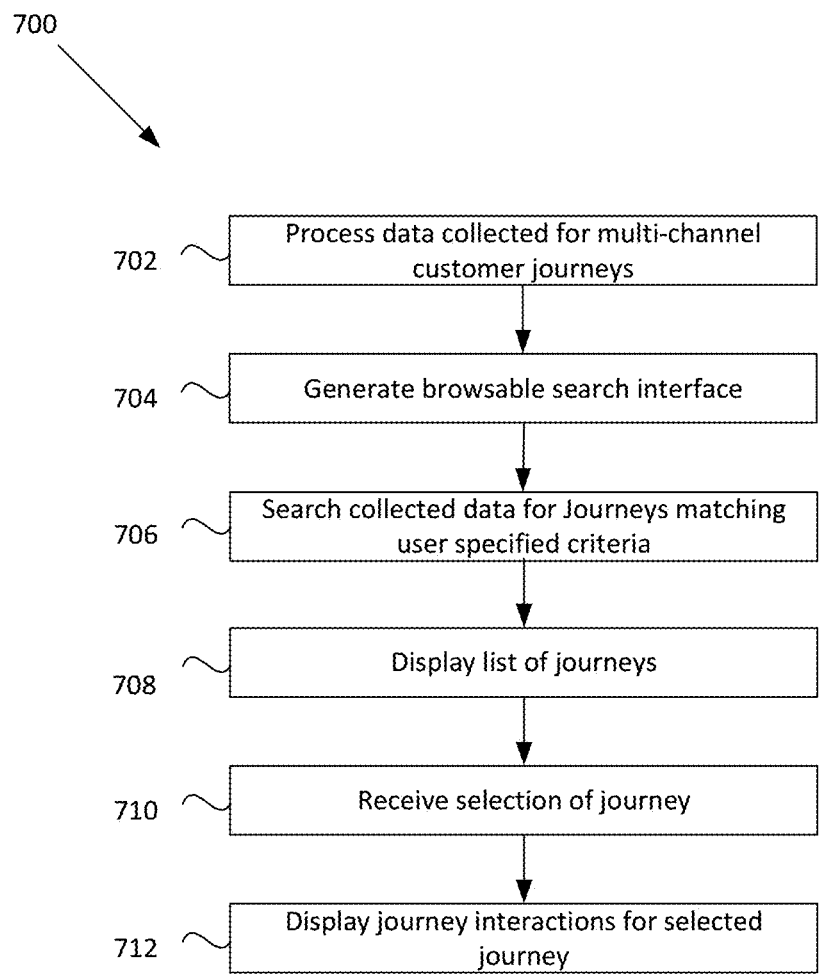
FIG. 7 shows a method for analyzing interaction data across multiple channels.

A method performed by the system 200 is shown in the flowchart 700 of FIG. 7. At step 702, data collected for a plurality of interactions across multiple channels is processed and correlated into journeys, the journeys typically having multiple interactions for multiple channel types. At step 704, a search interface is generated and presented to a user who can specify search criteria. The collected data is searched and filtered according to the specified criteria (step 706) and a list of journeys matching the criteria is displayed on the interface (step 708). A user can review the details of a journey by selecting the journey 710, which then causes the interactions within the journey to be displayed 712.

Figure 8:
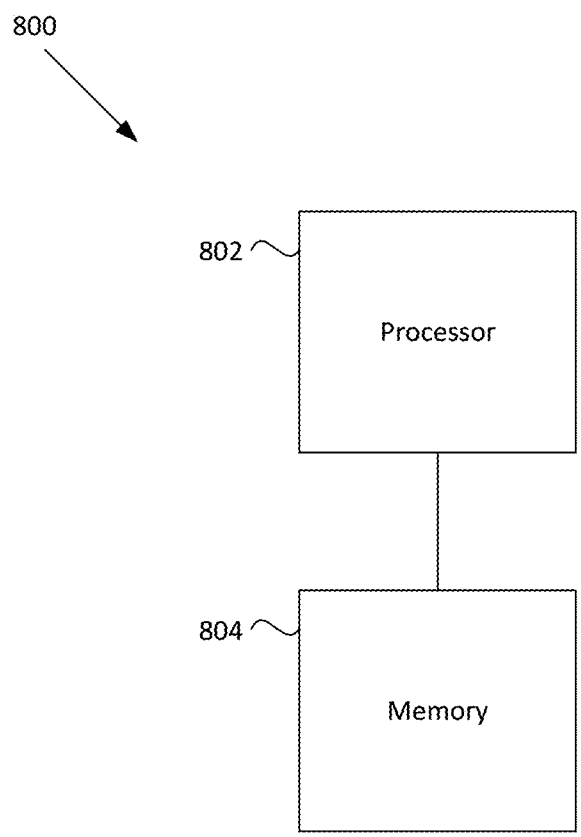
FIG. 8 shows a processor and memory for implementing the method illustrated in FIG. 7.

The method 700 of FIG. 7 may be performed by a processing system 800, as shown in FIG. 8. The processing system may include at least one processor 802 and at least one operatively associated memory 804. The method 700 may be embodied in computer-executable instructions that may be stored in the memory 804 and executed by the processor 802. Both the processor 802 and the memory 804 may be provided in singular or distributed forms.

In one example, a user initiates a web session via the web server 320 and web application 322. The web session may have a web session identifier. Web application logging 322 may record events during the internet session including the navigation history through the website, i.e. through the different pages and links within the domain. The web application logging 322 may also record time spent on particular pages, data entered on webforms, etc. During the web session, a webchat session may be invoked through the webchat service 326. The webchat session may be invoked by a direct request from the user, e.g. by selecting a link. The webchat session may also be invoked by a prompt from the server to the user.

The chat session will have its own chat session identifier but, being invoked from the web session, may also record the web session identifier from which it was invoked. During the webchat session, text exchanges between the user and webchat agent may be recorded. In the exchange, the agent will typically prompt the user for customer identifiers, product identifiers, etc. if this information has not already been provided through the web session. The customer may ultimately decide to call the customer contact center, either during the web chat session, directly after, or at some later time. During the call, the customer, or enterprise systems such as CTI 213 or CRM 232, may supply identifying parameters such as a customer ID, customer name, product information etc., either directly or automatically, to connect this interaction with the journey.

An analysis of the customer's interactions with the customer contact center may be performed. By analyzing the chain of interactions, the enterprise may determine that a special offer is required to ensure that the customer is satisfied with the outcome of their enquiry. As importantly, the analysis may reveal inefficiencies in the interaction chain that could otherwise have allowed the customer's enquiry to be more readily resolved. For example, the analysis may reveal that if the website had contained specific information relating to the customer's enquiry, then the enquiry could have been resolved during the customer's web session, thereby removing the need for a webchat session and follow up phone call. Thus, by identifying and remedying inefficiencies in the interaction chain across multiple channels, the costs of the customer contact process may be reduced.

The presently described embodiments can extend the focus on the caller experience from call centers to all channels that a customer may experience in trying to solve their problem. By focusing on single-customer experiences across multiple channels, better understanding of how problems arise may be achieved.

The system 200 and, in particular, the journey analytics system 240, may collect data across a vast number of customer interactions for an enterprise. Patterns across multiple journeys with multiple interactions, not just a single journey, can identify systemic problems in processes. By identifying patterns in journeys, changes can be made to the process, and then subsequent journeys may be monitored to see if the pattern improves, thereby making the customer service more efficient.

While specific examples of journeys have been described, the system applies to any relatively long-lived "journey" comprised of any number of relatively independent "conversations" between a specific customer and any number of client agents using any combination of types of "channels". To paraphrase, the system enables the large scale analysis of long-term conversations that are made of many smaller, otherwise independent, conversations regardless of the type.

As described herein, the journey analytics service 240 may be provided as a third-party service to an enterprise. A single third-party service may provide journey analytics services to multiple enterprises and, therefore, privacy of customer data is paramount. To protect customer privacy, journeys may be assigned an anonymized ID (journey ID)

that is able to link the different interactions that make up a journey without identifying the customer specifically, thus protecting all personal data of the customer.

Although embodiments of the present invention have been illustrated in the accompanied drawings and described in the foregoing description, it will be understood that the invention is not limited to the embodiments disclosed, but is capable of numerous rearrangements, modifications, and substitutions without departing from the spirit of the invention as set forth and defined by the following claims. For example, the capabilities of the invention can be performed fully and/or partially by one or more of the blocks, modules, processors or memories. Also, these capabilities may be performed in the current manner or in a distributed manner and on, or via, any device able to provide and/or receive information. Further, although depicted in a particular manner, various modules or blocks may be repositioned without departing from the scope of the current invention. Still further, although depicted in a particular manner, a greater or lesser number of modules and connections can be utilized with the present invention in order to accomplish the present invention, to provide additional known features to the present invention, and/or to make the present invention more efficient. Also, the information sent between various modules can be sent between the modules via at least one of a data network, the Internet, an Internet Protocol network, a wireless source, and a wired source and via plurality of protocols.

What is claimed is:

1. A method comprising:
    receiving customer interaction data from a plurality of customer interactions comprising two or more of a call, a chat interaction, an email interaction and a web interaction;
    processing the data collected for the plurality of customer interactions across a plurality of types of communication channels of a customer contact center to identify a plurality of journeys associated with the plurality of the customer interactions and to create a log comprising call routing data and agent data associated with one or more agents which were part of the customer interactions;
    searching the collected data and displaying a list of the one or more journeys comprising the one or more customer interactions having the specified one or more properties;
    in response to receiving a selection of a journey from the list of journeys:
        identifying a plurality of journey interactions that occurred during the selected journey and which comply with predetermined filter criteria which comprises a journey timeline and pattern classification data which identifies one or more patterns of the customer interaction data which occurred prior to a customer resolution, and wherein the one or more patterns comprise which of the one or more communication channels was being used when a customer issue was experienced;
        identifying, based on the identified one or more communication channels, whether including customer issue information on an online website associated with the web interaction will prevent subsequent instances of the customer issue from occurring; and
        displaying a visual representation of the plurality of journey interactions based on the predetermined filter criteria which occurred during the selected journey.

2. The method of claim 1 wherein the selected journey comprises a first journey interaction comprising the call in a voice channel and at least one second journey interaction comprising the at least one chat interaction with the customer contact center.

3. The method of claim 1 wherein the selected journey comprises a first journey interaction comprising the chat interaction and at least one second journey interaction comprising the at least one web session interaction with the customer contact center.

4. The method of claim 1 wherein the selected journey comprises a first journey interaction comprising the call in a voice channel and at least one second journey interaction comprising the at least one email interaction with the customer contact center.

5. The method of claim 1 comprising receiving a selection of a journey interaction of the plurality of journey interactions on the timeline, and in response to the selection, displaying a single interaction display for the selected journey interaction that is dependent on a communication channel type of the selected journey interaction.

6. The method of claim 1 wherein displaying the visual representation comprises:
    displaying a dialogue window; and
    displaying within the dialogue window a scrollable list of dialogue of the plurality of journey interactions of the selected journey, the scrollable list of dialogue comprising dialogue from a plurality of types of journey interactions.

7. A system comprising at least one processor programmed to:
    receive customer interaction data from a plurality of customer interactions comprising two or more of a call, a chat interaction, an email interaction and a web interaction;
    process the data collected for the plurality of customer interactions across a plurality of types of communication channels of a customer contact center to identify a plurality of journeys associated with the plurality of the customer interactions and to create a log comprising call routing data and agent data associated with one or more agents which were part of the customer interactions;
    search the collected data and display a list of the one or more journeys comprising the one or more customer interactions having the specified one or more properties;
    in response to receiving a selection of a journey from the list of journeys:
        identify a plurality of journey interactions that occurred during the selected journey and which comply with predetermined filter criteria, the plurality of journey interactions comprising a plurality of communication channel types which comprises a journey timeline and pattern classification data which identifies one or more patterns of the customer interaction data which occurred prior to a customer resolution, and wherein the one or more patterns comprise which of the one or more communication channels was being used when a customer issue was experienced;
        identify, based on the identified one or more communication channels, whether including customer issue information on an online website associated with the web interaction will prevent subsequent instances of the customer issue from occurring; and display a visual representation of the plurality of journey interactions based on the predetermined filter criteria which occurred during the selected journey.

8. The system of claim 7 wherein the selected journey comprises a first journey interaction comprising the call in a voice channel and at least one second journey interaction comprising the at least one chat interaction with the customer contact center.

9. The system of claim 7 wherein the selected journey comprises a first journey interaction comprising the chat interaction and at least one second journey interaction comprising the least one web session interaction with the customer contact center.

10. The system of claim 7 wherein the selected journey comprises a first journey interaction comprising the call in a voice channel and at least one second journey interaction comprising the least one email interaction with the customer contact center.

11. The system of claim 7 wherein the processor is programmed to receive a selection of a journey interaction of the plurality of journey interactions on the timeline, and in response to the selection, display a single interaction display for the selected journey interaction that is dependent on a communication channel type of the selected journey interaction.

12. The system of claim 7 wherein the processor is programmed to display, within the visual representation, a dialogue window, and display within the dialogue window, a scrollable list of dialogue of the plurality of journey interactions of the selected journey, the scrollable list of dialogue comprising dialogue from a plurality of types of journey interactions.

13. A non-transitory computer readable storage medium configured to store instructions that when executed cause a processor to perform:
receiving customer interaction data from a plurality of customer interactions comprising two or more of a call, a chat interaction, an email interaction and a web interaction;
processing the data collected for the plurality of customer interactions across a plurality of types of communication channels of a customer contact center to identify a plurality of journeys associated with the plurality of the customer interactions and to create a log comprising call routing data and agent data associated with one or more agents which were part of the customer interactions;
searching the collected data and displaying a list of the one or more journeys comprising the one or more customer interactions having the specified one or more properties;
in response to receiving a selection of a journey from the list of journeys:
identifying a plurality of journey interactions that occurred during the selected journey and which comply with predetermined filter criteria which comprises a journey timeline and pattern classification data which identifies one or more patterns of the customer interaction data which occurred prior to a customer resolution, and wherein the one or more patterns comprise which of the one or more communication channels was being used when a customer issue was experienced;
identifying, based on the identified one or more communication channels, whether including customer issue information on an online website associated with the web interaction will prevent subsequent instances of the customer issue from occurring; and
displaying a visual representation of the plurality of journey interactions based on the predetermined filter criteria which occurred during the selected journey.

14. The non-transitory computer readable storage medium of claim 13 wherein the selected journey comprises a first journey interaction comprising the call in a voice channel and at least one second journey interaction comprising the least one chat interaction with the customer contact center.

15. The non-transitory computer readable storage medium of claim 13 wherein the selected journey comprises a first journey interaction comprising the chat interaction and at least one second journey interaction comprising the least one web session interaction with the customer contact center.

16. The non-transitory computer readable storage medium of claim 13 comprising receiving a selection of a journey interaction of the plurality of journey interactions on the timeline, and in response to the selection, displaying a single interaction display for the selected journey interaction that is dependent on a communication channel type of the selected journey interaction.

17. The non-transitory computer readable storage medium of claim 13 wherein displaying the visual representation comprises:
displaying a dialogue window; and
displaying within the dialogue window a scrollable list of dialogue of the plurality of journey interactions of the selected journey, the scrollable list of dialogue comprising dialogue from a plurality of types of journey interactions.

\* \* \* \* \*